(12) United States Patent
Dehlsen et al.

(10) Patent No.: US 12,102,964 B2
(45) Date of Patent: Oct. 1, 2024

(54) REVERSE OSMOSIS WATER PRODUCTION APPARATUS

(71) Applicant: Dehlsen Associates of the Pacific Limited, Santa Barbara, CA (US)

(72) Inventors: James George Purnell Dehlsen, Warkworth (NZ); Peter Stricker, Santa Barbara, CA (US)

( * ) Notice: Subject to any disclaimer, the term of this patent is extended or adjusted under 35 U.S.C. 154(b) by 453 days.

(21) Appl. No.: 17/087,309

(22) Filed: Nov. 2, 2020

(65) Prior Publication Data

US 2021/0046422 A1    Feb. 18, 2021

Related U.S. Application Data

(62) Division of application No. 16/129,783, filed on Sep. 12, 2018, now abandoned.

(30) Foreign Application Priority Data

Sep. 22, 2017   (NZ) ........................ 735748

(51) Int. Cl.
*B01D 61/08*    (2006.01)
*B01D 61/02*    (2006.01)
(Continued)

(52) U.S. Cl.
CPC ........... *B01D 61/08* (2013.01); *B01D 61/025* (2013.01); *B01D 61/026* (2022.08); *B01D 61/10* (2013.01);
(Continued)

(58) Field of Classification Search
CPC .... B01D 61/08; B01D 61/022; B01D 61/025; B01D 61/10; B01D 63/06; B01D 2313/06; B01D 2317/04; B01D 2317/06; B01D 2313/54; B01D 2315/06; B01D 61/026; B01D 2313/20; B01D 2313/56; B01D 61/02; B01D 2313/367; C02F 1/441; C02F 2103/08; C02F 2307/00; C02F 2201/007; C02F 2201/008; C02F 2303/10;
(Continued)

(56) References Cited

U.S. PATENT DOCUMENTS

| | | | | |
|---|---|---|---|---|
| 4,125,463 A | * | 11/1978 | Chenoweth | ............ B01D 65/02 210/636 |
| 4,222,874 A | | 9/1980 | Connelly | |

(Continued)

FOREIGN PATENT DOCUMENTS

| | | |
|---|---|---|
| EP | 1637214 A1 | 3/2006 |
| WO | 2016057717 A1 | 4/2016 |

*Primary Examiner* — Akash K Varma
(74) *Attorney, Agent, or Firm* — Felix L. Fischer

(57) ABSTRACT

A reverse osmosis water production apparatus for use in a body of water includes a first section defining a buoyancy chamber and an elongate second section connected to the first section and configured to define an elongate chamber which extends downward beneath a waterline in use. The elongate chamber is provided with a plurality of elongate reverse osmosis membrane tubes, each tube containing a reverse osmosis membrane. A longitudinal axis of each reverse osmosis membrane tube is substantially parallel with a longitudinal axis of the elongate chamber and the reverse osmosis membrane tubes are arranged around a passage.

11 Claims, 6 Drawing Sheets

(51) Int. Cl.
    *B01D 61/10*     (2006.01)
    *B01D 63/06*     (2006.01)
    *B63B 1/04*     (2006.01)
    *B63B 43/06*     (2006.01)
    *B63B 75/00*     (2020.01)
    *B63B 77/00*     (2020.01)
    *C02F 1/44*     (2023.01)
    *B63B 1/10*     (2006.01)
    *B63B 35/44*     (2006.01)
    *B63B 39/03*     (2006.01)
    *B63B 43/04*     (2006.01)
    *C02F 103/08*     (2006.01)

(52) U.S. Cl.
    CPC .............. *B63B 1/048* (2013.01); *B63B 43/06* (2013.01); *B63B 75/00* (2020.01); *B63B 77/00* (2020.01); *C02F 1/441* (2013.01); *B01D 2313/06* (2013.01); *B01D 2313/2011* (2022.08); *B01D 2313/367* (2022.08); *B01D 2313/54* (2013.01); *B01D 2313/57* (2022.08); *B01D 2315/06* (2013.01); *B01D 2317/04* (2013.01); *B01D 2317/06* (2013.01); *B63B 2001/044* (2013.01); *B63B 1/107* (2013.01); *B63B 2035/442* (2013.01); *B63B 39/03* (2013.01); *B63B 2043/047* (2013.01); *C02F 2103/08* (2013.01); *C02F 2201/007* (2013.01); *C02F 2201/008* (2013.01); *C02F 2303/10* (2013.01); *C02F 2307/00* (2013.01); *Y02A 20/131* (2018.01); *Y02W 10/30* (2015.05); *Y02W 10/33* (2015.05)

(58) Field of Classification Search
    CPC . C02F 1/44; B63B 1/048; B63B 43/06; B63B 9/065; B63B 1/107; B63B 2009/067; B63B 2001/044; B63B 39/03; B63B 2035/442; B63B 2043/047; B63B 75/00; B63B 77/00; B63B 1/04; Y02A 20/131; Y02W 10/30; Y02W 10/33
    USPC ..................................................... 210/170.05
    See application file for complete search history.

(56) References Cited

U.S. PATENT DOCUMENTS

| | | |
|---|---|---|
| 2003/0189000 A1 | 10/2003 | Stark et al. |
| 2010/0126164 A1 | 5/2010 | Gerber et al. |
| 2011/0215039 A1 | 9/2011 | Acernese et al. |
| 2015/0260152 A1* | 9/2015 | Dehlsen ................ F03B 17/061 416/244 B |
| 2015/0290589 A1 | 10/2015 | Hoffman |
| 2016/0101994 A1 | 4/2016 | Vuong |
| 2017/0233977 A1 | 8/2017 | Cole et al. |
| 2017/0349455 A1* | 12/2017 | Katz ...................... B01D 61/06 |

\* cited by examiner

REVERSE OSMOSIS WATER PRODUCTION APPARATUS

CROSS-REFERENCE TO RELATED APPLICATION

The present application is a divisional of, and claims priority to, U.S. patent application Ser. No. 16/129,783 filed Sep. 12, 2018, entitled "REVERSE OSMOSIS WATER PRODUCTION APPARATUS," which claims priority of New Zealand Patent Application Serial No. 735748 filed on Sep. 22, 2017, the disclosure of which is incorporated herein by reference.

TECHNICAL FELD

The present invention relates to a reverse osmosis water production apparatus, and in particular, but not exclusively, to a desalination apparatus for use in a body of water.

BACKGROUND ART

Reverse Osmosis (RO) systems for high volume seawater to fresh water production are generally land based and are typically either in the form of large central plants near the coast, or smaller systems, some packaged in a shipping container type enclosure.

Regions experiencing significant drought (or other interruption to the regular water supply) require the prompt establishment of a substantial new water supply. Large central RO plants may require years of planning and permitting, along with the need for a substantial electric power supply. Furthermore, high capacity pipelines are required to draw seawater in to the system and to discharge brine back to the ocean. The pooling of brine around the end of the brine discharge pipe can have adverse impacts on marine life in the vicinity and is a key hurdle in environmental permitting.

Marine barge mounted systems are becoming available, which can transit at sea, stationing in coastal areas in need of freshwater. Some of these have an on-board electric power generating systems and fuel supplies while others rely on power from shore.

Most marine vessel's RO systems are designed to meet the on-board water requirements. Most desalination systems on marine vessels are based on RO membranes contained in tubular pressure vessels which are orientated horizontally to fit a horizontal spatial arrangement in the vessel.

An RO surface vessel may impose an undesirable view on coastline natural beauty, which can be particularly undesirable if the vessel is moored in an area which is dependent on tourism.

A permanently moored RO surface vessel for long-term commercial water delivery to shore is not easily moved out of harm's way. Marine surface vessels are also subject to extreme environmental forces of wind and waves, where pitch and roll in high seas can test survival. Vessels with a large surface profile are especially vulnerable to high winds.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

It Is an object of the present invention to address the foregoing problems or at least to provide the public with a useful choice.

Further aspects and advantages of the present invention will become apparent from the ensuing description which is given byway of example only.

DISCLOSURE OF THE INVENTION

According to one aspect of the present invention there is provided a reverse osmosis water production apparatus for use in a body of water comprising;
  a first section defining a buoyancy chamber;
  an elongate second section connected to the first section and configured to define an elongate chamber which extends downward beneath a waterline in use, the elongate chamber provided with a plurality of elongate reverse osmosis membrane tubes, each tube containing a reverse osmosis membrane, wherein a longitudinal axis of each reverse osmosis membrane tube is substantially parallel with a longitudinal axis of the elongate chamber;
  wherein the reverse osmosis membrane tubes are arranged around a passage.

Preferably the first section is substantially cylindrical.

Preferably the second section is substantially cylindrical.

Preferably a diameter of the first section is greater than a diameter of the second section, more preferably around two times the diameter of the second section.

Preferably the reverse osmosis membrane tubes are arranged in a substantially concentric ring around the passage.

Preferably the reverse osmosis membrane tubes are arranged to form an inner concentric ring and an outer concentric ring around the passage.

Preferably a reverse osmosis membrane tube from the inner ring and a reverse osmosis tube from the outer ring are connected together to form a first reverse osmosis membrane tube module.

Preferably a reverse osmosis membrane tube from the inner ring and two adjacent reverse osmosis tubes from the outer ring are connected together to form a second reverse osmosis membrane tube module.

Preferably the apparatus comprises a plurality of first reverse osmosis membrane tube modules and a plurality of second reverse osmosis membrane tube modules.

Preferably the first and second reverse osmosis membrane tube modules are arranged alternately.

Preferably a spacing between the first and second reverse osmosis membrane tube modules is such that one of the first reverse osmosis membrane tube modules must be removed before any one of the second reverse osmosis membrane tube modules can be removed.

Preferably the passage is selectively communicable with the first section.

Preferably the passage extends through the first section of the buoy.

Preferably the apparatus comprises moving means capable of moving at least one reverse osmosis membrane tube into the passage.

Preferably the moving means is capable of moving an entire first reverse osmosis membrane tube module into the passage.

Preferably the moving means is capable of moving an entire second reverse osmosis membrane tube module into the passage.

Preferably the moving means comprises an arm.

Preferably the arm is rotatably connected a support member.

Preferably the base is rotatably connected to the second section.

Preferably the connection between the base and the arm is offset from a centre of the chamber.

Preferably an upper surface of the buoy comprises a deck, wherein the deck is provided with an access way which is substantially aligned with the elongate chamber.

Preferably the buoy comprises a lifting means for lifting at least one reverse osmosis membrane tube up to the deck.

Preferably the lifting means comprises a crane.

Preferably the apparatus comprises one or more additional sections, each additional section configured to define an additional elongate chamber which extends downward beneath the water in use, the additional elongate chamber provided with a plurality of additional elongate reverse osmosis membrane tubes, wherein a longitudinal axis of each additional reverse osmosis membrane tube is substantially parallel with a longitudinal axis of the additional elongate chamber;

wherein the additional reverse osmosis membrane tubes are arranged around the additional passage.

Preferably the apparatus comprises a ballast tank at a distal end of the apparatus to the first section.

BRIEF DESCRIPTION OF DRAWINGS

Further aspects of the present invention will become apparent from the following description which is given by way of example only and with reference to the accompanying drawings in which.

BRIEF DESCRIPTION OF PREFERRED
EMBODIMENTS OF THE INVENTION

Figure 1:
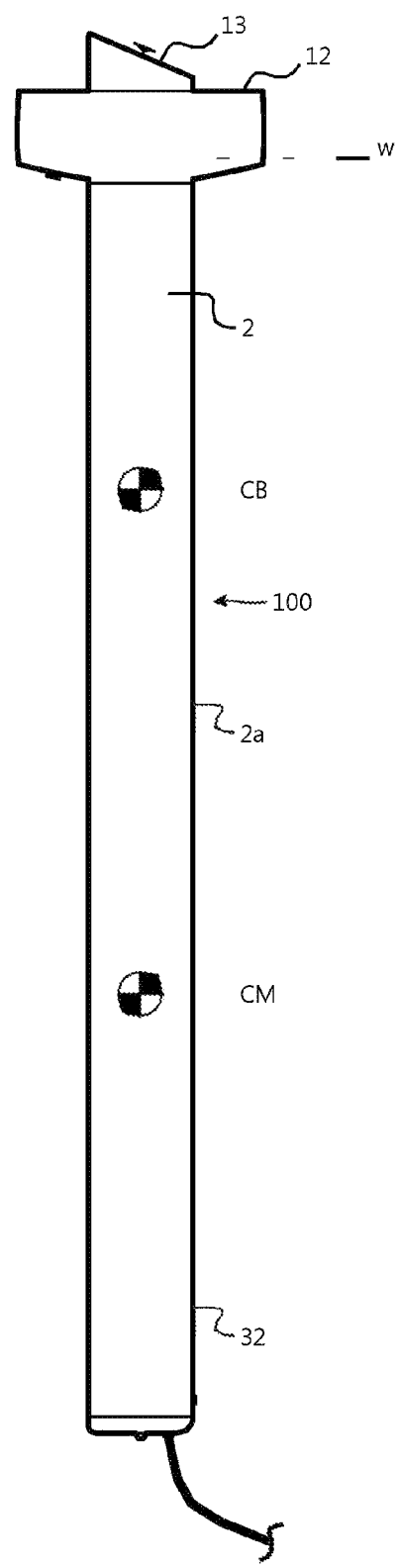
FIG. 1 is a side view of an embodiment of a reverse osmosis water production apparatus of the present invention.
Figure 2:
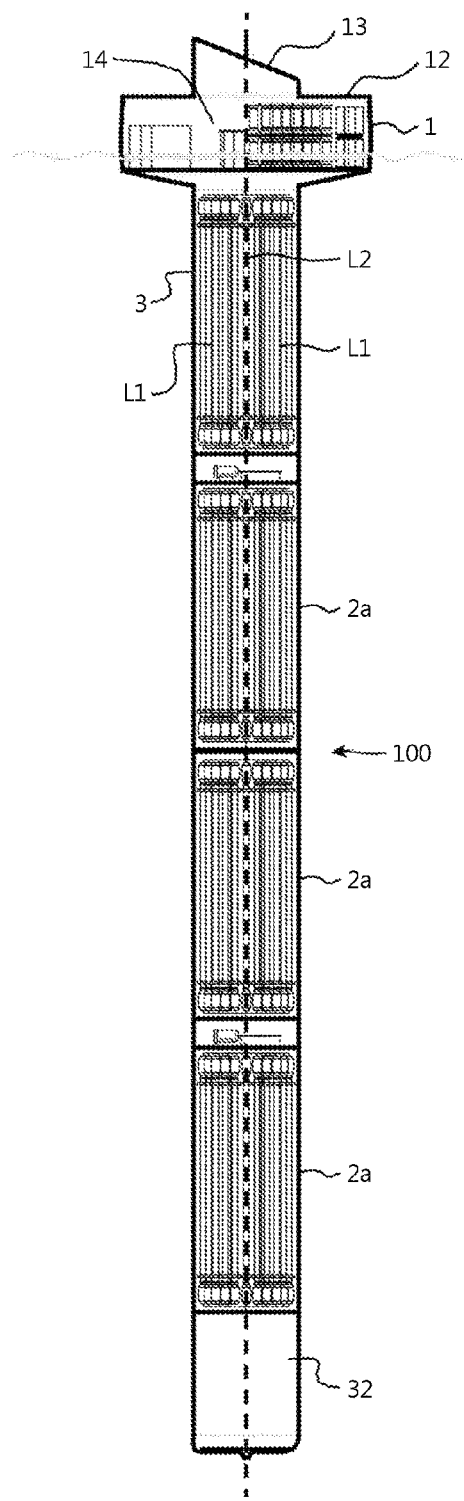
FIG. 2 is a side view of the apparatus of FIG. 1 with an outer wall of the apparatus not shown to reveal the internal RO tube arrangement of the apparatus.

Referring first to FIGS. 1 and 2, a reverse osmosis (RO) water production apparatus is generally referenced by arrow 100. In the embodiment shown in the figures the apparatus 100 is configured as a submersible spar buoy and is intended for use as a desalination apparatus.

The apparatus 100 is configured to float in a body of water, in particular saline water, and comprises a first section 1 which defines a buoyancy chamber and an elongate second section 2 in operation, which extends downward beneath the waterline W when in RO operation. In preferred embodiments both the first and the second sections 1, 2 are substantially cylindrical. The diameter of the first section 1 is preferably greater than the diameter of the second section 2 (for example around twice the diameter of the second section) so that in operation, when all the RO membrane tubes and plumbing are filled with water, the centre of buoyancy CB of the apparatus 100 is higher than the centre of mass CM and sufficiently separated to provide vertical stability. When the RO membrane tubes and plumbing is emptied of water vessel mass is reduced and buoyancy increased, and the CB moves in near proximity to the CM causing the vessel to rotate to a horizontal position on the ocean surface.

Figure 3:
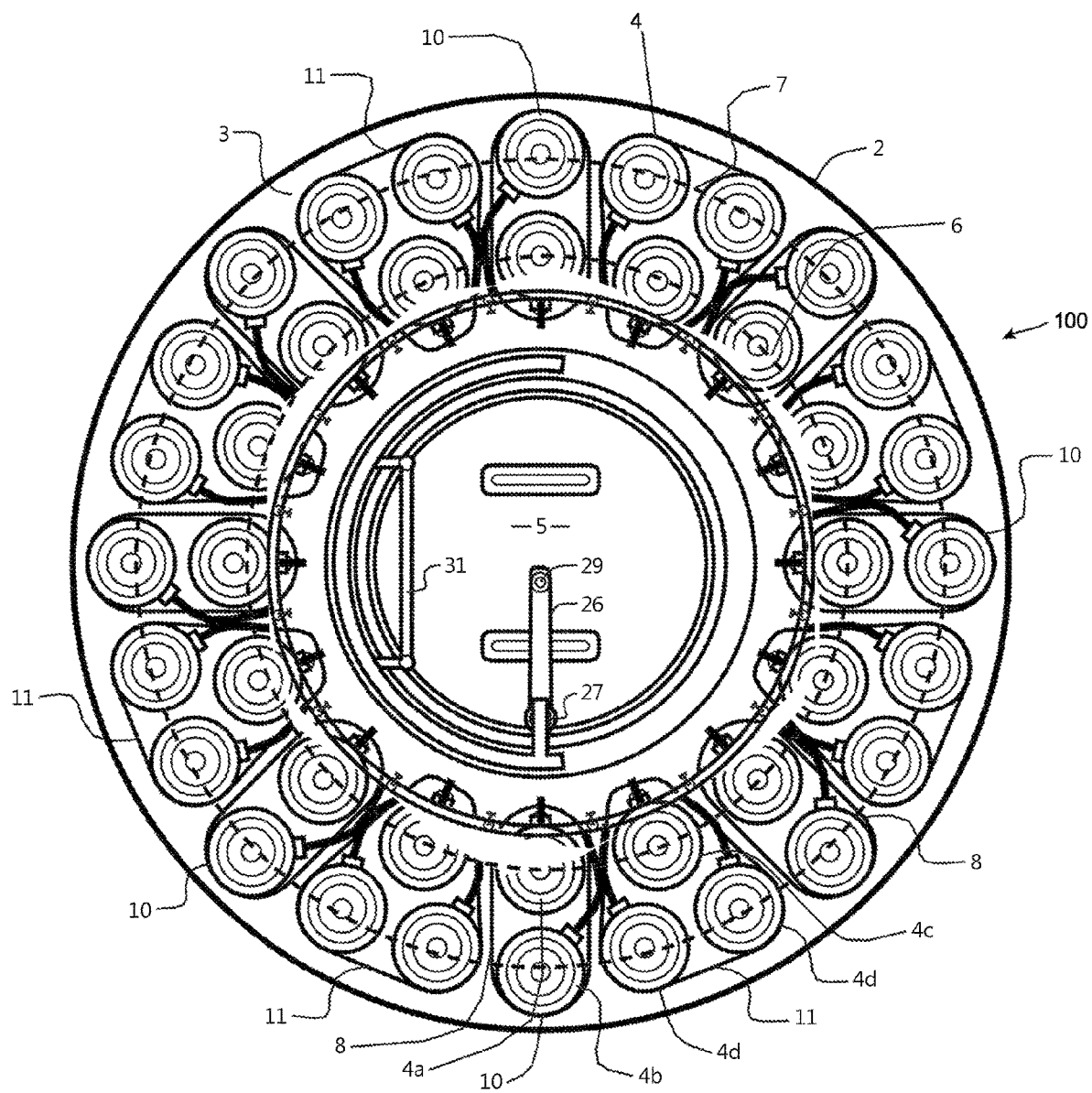
FIG. 3 is a top view of the second section of the apparatus of FIG. 1.

As seen in FIGS. 2 and 3, the second section 2 defines an elongate chamber 3 which is provided with a plurality of elongate reverse osmosis membrane tubes 4. Each tube contains reverse osmosis membranes (not shown). The RO tubes 4 are arranged around a passage 5 which is preferably substantially central to the chamber. The tubes 4 function as RO pressure vessels for the pumped and pressurized seawater and are provided with valving at suitable inlets for raw water and outlets for product (desalinated) water and brine waste water. A longitudinal axis $L1$ of each tube 4 is preferably substantially parallel with a longitudinal axis $L2$ of the second section 2. The longitudinal axes of the second section 2 and the tubes 4 are preferably orientated substantially vertically in use.

In one non-limiting embodiment, the first section may have a diameter of around 8.2 m and the second section may have a diameter of around 3.5 m and a length of around 8.5 m. The passage may have a diameter of around 1.5 m.

In preferred embodiments, the reverse osmosis membrane tubes 4 are arranged to form at least one ring around the passage 5. In the embodiment shown the tubes form an inner ring 6 and a concentric outer ring 7.

Figure 6:
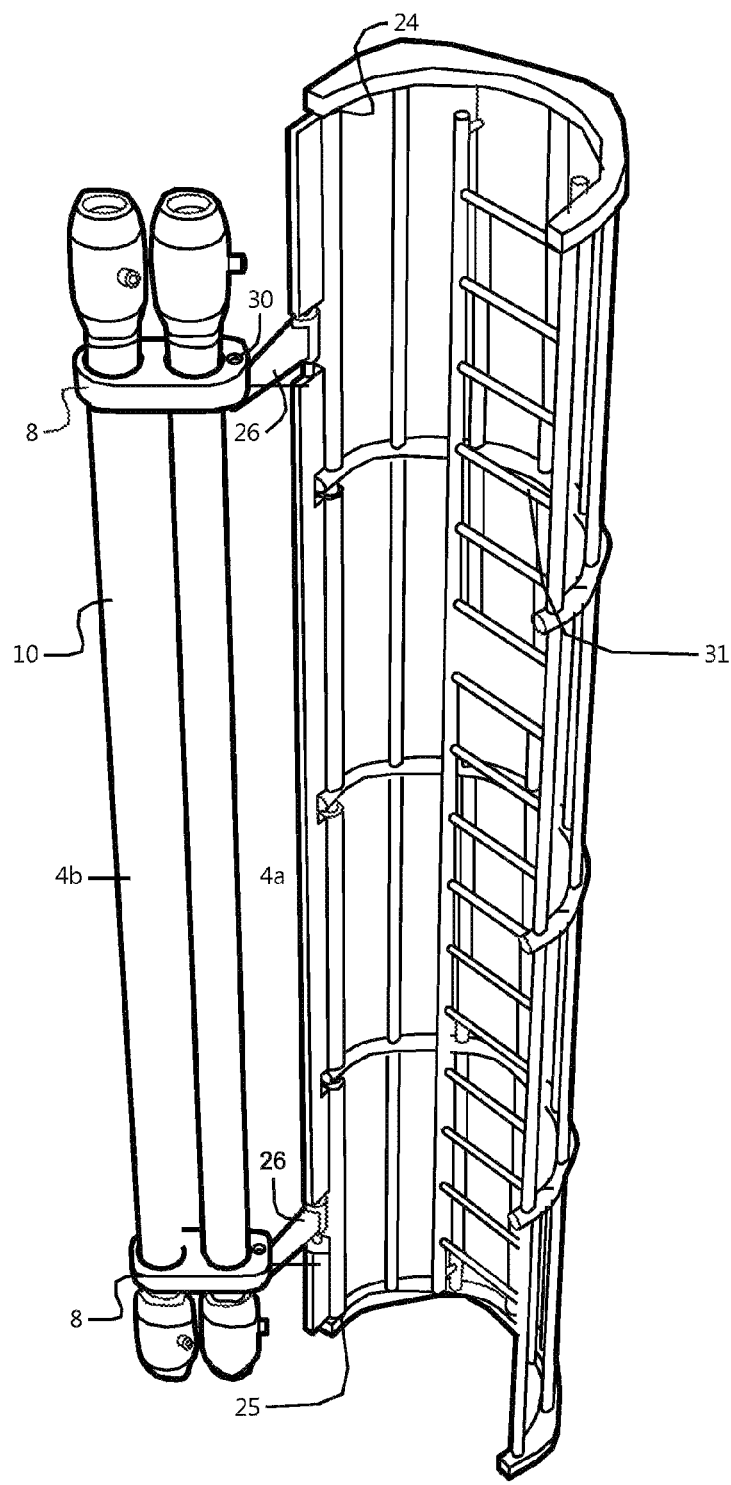
FIG. 6 is a perspective view of the moving means connected to a first reverse osmosis membrane tube module, with the remainder of the modules and the outer wall of the second section not shown for clarity.

As can be seen in FIG. 3, in some embodiments a reverse osmosis membrane tube 4a from the inner ring 6 is connected to a reverse osmosis membrane tube 4b from the outer ring 7 by suitable bracketry 8 (an example of which is shown in FIG. 6) to form a first reverse osmosis membrane tube module 10. A second reverse osmosis membrane tube 4c from the inner ring 6 is connected to two further reverse osmosis membrane tubes 4d from the outer ring 7 by suitably bracketry to form a second reverse osmosis membrane tube module 11. In the embodiment shown the inner and outer rings 6, 7 are formed by alternating first and second reverse osmosis membrane tubes modules 10, 11. As can be seen in FIG. 3, arranging alternating first and second reverse osmosis membrane tubes modules 10, 11 in this way creates a very compact arrangement of alternating first and second reverse osmosis membrane tubes 4 is created which allows for tube module removal. Other combinations of tubes and modules may be arranged to provide maximum compactness with full accessibility.

Over time, the reverse osmosis membranes drop in osmotic efficiency due to membranes clogging-up with particulates and scaling with mineral deposits. This leads to a requirement for membrane cleaning or replacement.

Removal of one or more reverse osmosis membrane tubes 4 is facilitated by the passage 5. In preferred embodiments an upper surface 12 (FIG. 1) of the apparatus 100 is provided with an access way 13, for example a hatch, which is substantially aligned with the passage 5 in the second section 2. The portion of the first section 1 between the access way 13 and the passage 5 preferably also comprises a clear passage 14, or can at least be configured to provide a passage 14 (for example by opening of a hatch between the first and second sections and/or moving of equipment in the first section 1). In this way a lifting means, typically a crane (not shown), provided on an exterior of the first section 1 can be used to lift one or more reverse osmosis membrane tubes 4 from the second section 2 to the exterior of the first section 1, from where the tube 4 can be removed for servicing, repair or replacement.

Figure 4:
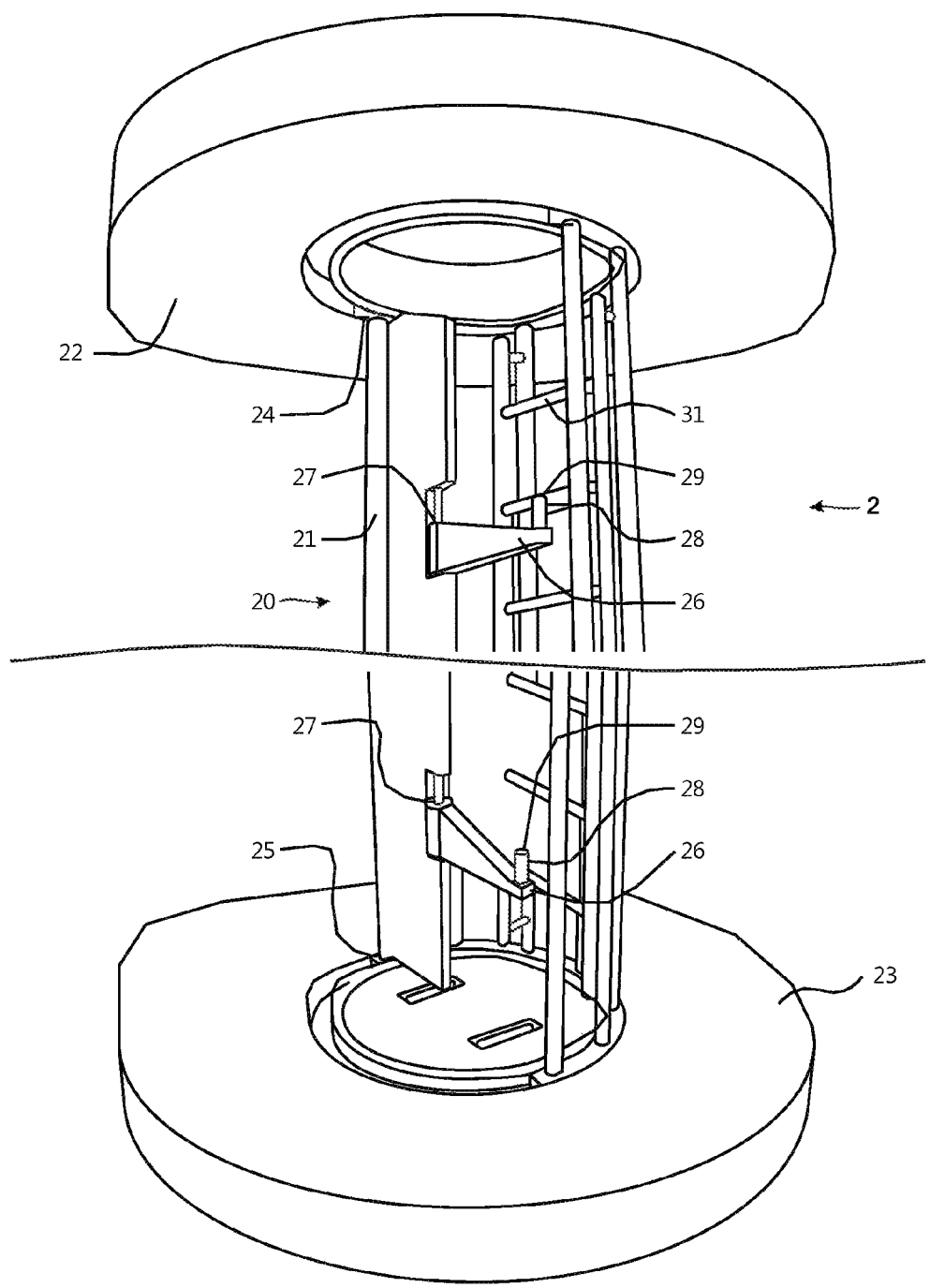
FIG. 4 is a perspective view of the bulkheads and moving means of the second section.
Figure 5:
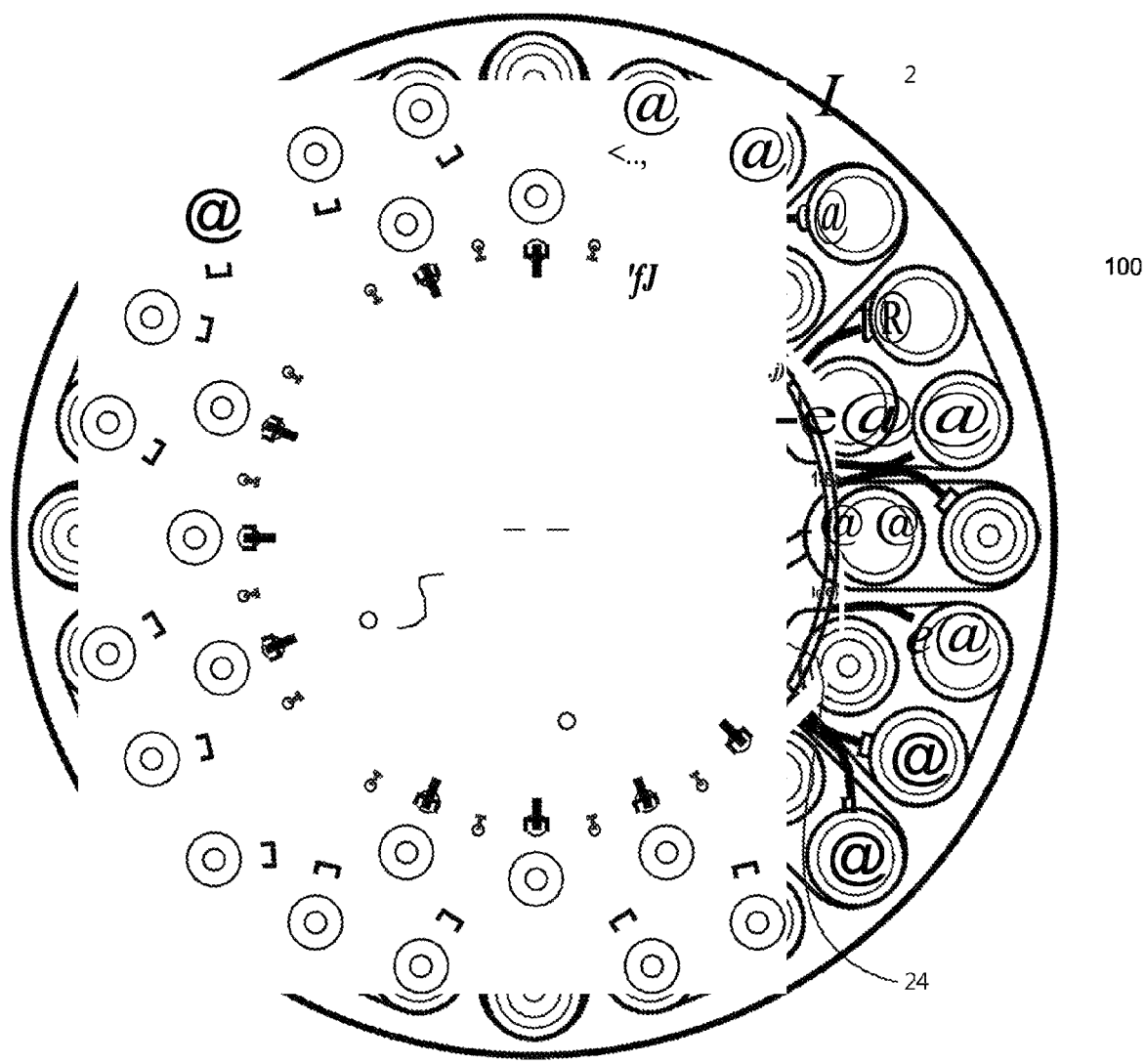
FIG. 5 is a top view of the second section of the apparatus of FIG. 1 showing the moving means engaged with a first reverse osmosis membrane tube module.

In preferred embodiments the second section 2 may be provided with a moving means 20 (FIG. 4) which is capable of moving a reverse osmosis membrane tube 4, or a reverse osmosis membrane tube module 10, 11, from its normal operating position to a position in the passage 5 from which it can be conveniently serviced and/or lifted by the lifting means. FIGS. 4 to 6 show one embodiment of such a moving means 20 which is adapted for use with first and second reverse osmosis membrane tube modules 10, 11.

Referring to FIG. 4 in particular, a preferred embodiment of the moving means 20 comprises a support member 21 which extends between an upper bulkhead 22 and a lower bulkhead 23. The support member 21 is connected to the bulkheads 22, 23 by rotatable connections 24, 25 which allow the support member 21 to rotate around an annular path around the outside of the passage 5, and to rotate about a rotational axis which intersects the connections 24, 25.

The moving means 20 comprises at least one, and preferably a plurality of arms 26. Each arm 26 is connected to the support member 21 by a respective rotatable connection 27. A distal end of each arm 26 is provided with engagement means 28 for engaging a reverse osmosis membrane tube 4 and/or a reverse osmosis membrane tube module 10, 11. In the embodiment shown the engagement means 28 comprises a pin 29 which is adapted to engage an aperture 30 in a bracket 8 which is attached to the reverse osmosis membrane tube 4 or reverse osmosis membrane tube module 10, 11, but other engagement means (for example gripping means) may be provided.

Prior to RO module removal, valves in the sea water intake manifold, the brine discharge outlet, and the product water feed line are all dosed, isolating and disconnecting the module for removal of the module while the other modules continue to function.

In use, each arm 26 is engaged with the reverse osmosis membrane tube 4 or module 10, 11 by moving the pin 29 underneath the aperture 30 and then moving the arm 26 upward by means of a suitable actuator (not shown) until the arm 26 is bearing the weight of the reverse osmosis membrane tube 4 or module 10, 11. The tube/module can then be disconnected from the second section 2 and moved into the passage 5 by articulation of the arm 26 and support member 21. Once in the passage 5, maintenance tasks can be performed on the tube or module and/or the tube or module can be lifted out of the apparatus 100 or reinstalled in its operating position. In preferred embodiments a ladder 31 is provided between the bulkheads 22, 23 at an outer periphery of the passage 5, and may be connected to the support member 21 so as to rotate with the support member. The ladder 31 may be used to reach the lower bulkhead 23 as well as for access to the tube/module mounting components and pipework.

As best seen in FIG. 3, in preferred embodiments the spacing between the first and second reverse osmosis membrane tube modules 10, 11 is relatively small in order to make the second section 2 as small in diameter as possible. In preferred embodiments the reverse osmosis membrane tube modules 10, 11 are sufficiently closely spaced that it is not possible to move any of the second reverse osmosis membrane tube modules 11 into the passage 5 without first removing an adjacent reverse osmosis membrane tube module 10. Compact spacing of the membrane tube modules 10, 11 is advantageous for a number of reasons, including reducing the diameter of the second section, thereby reducing the cross-sectional area which is acted on by wave and current action, as well as mass buoyancy balance and control, as is described further below.

In some embodiments the apparatus 100 may comprise one or more additional sections 2a connected below the second section 2, each additional section 2a having the same features as the second section 2. A watertight hatch (not shown) is preferably provided at each bulkhead. By use of this modular configuration the potable water production water capacity of the apparatus 100 can be configured to match product water supply requirements. Each additional section 2a is preferably close to neutrally buoyant (when the reverse osmosis membrane tubes and associated pipework are filled with water) so that connection of additional sections 2a does not move the centre of mass too close to the centre of buoyancy, which would compromise the vertical stability of the apparatus. However, in preferred embodiments the apparatus 100 comprises a ballast tank 32 at the lower end of the apparatus (distal the first section 1). The ballast tank 32 water volume can be adjusted as required to make small buoyancy adjustments relative to the centre of mass of the apparatus 100.

Deployment

Rapid, low cost transit/transport is key to the economic viability of marine reverse osmosis (RO) systems and essential for emergency deployment for water supply. The apparatus may need to traverse shallow water during departure from ports and in coastal transit. In preferred embodiments the apparatus 100 may be deployed horizontally, floating on the ocean surface, and may be towed by a service vessel to its operating site. At the site, while the apparatus 100 is still in a horizontal position, dry connections can be made for the mooring lines to the seabed anchors and the water conduit pipe and power cable to shore (or other power source). Once the apparatus 100 is secured, the RO system is activated with its on-board seawater pumps filling the membrane tubes 4 (and optionally the ballast tank 32), causing the mass of the lower end of the apparatus 100 to increase, whereby the apparatus gradually rotates 90 degrees to a vertical position. To remove the apparatus 100 back to a shore base, the membrane tubes 4 and any ballast tanks 32 can be pumped dry, reducing the mass at the lower end of the apparatus such that the reduced mass and added buoyancy gradually rotate the apparatus to a horizontal position for towing.

When in the in-use or vertical orientation, the first section 1 penetrates the ocean surface with a low profile, while the second and additional sections 2, 2a may reach tens or hundreds of meters into deeper water. The freeboard above the water surface can be adjusted by ballast tank water volume adjustments. In operation the apparatus 100 is highly stable, with minimal surface exposure and response to wind loads, wave heave and wave orbital forces. The freeboard of the apparatus 100 is preferably sufficient to a low easy entry by crew for servicing via the topside access way/hatch 13, while still presenting a very low surface profile which has minimal aesthetic impact. In certain instances, it may be required to completely submerge the apparatus, which can be effected by reducing positive vessel buoyancy to minimum, and by adapting the vertical mooring line to function as a tension leg system, whereby a winch can be activated to draw down the apparatus below the ocean surface.

Depth Pressure Augmented Reverse Osmosis

The preferred cylindrical shape of the sections making up the apparatus 100 is ideal to withstand increased hydrostatic pressure as the apparatus extends into deeper water.

In a preferred embodiment the second and additional sections contain the pumps, valves, actuators and controls to operate that section as a discrete unit. Each section 2, 2a may draw inlet seawater to a common manifold (for the section) as well as collecting product water and brine, each to respective outlet manifolds.

Utilizing the hydrostatic pressure reduces the power needed to create a suitable pressure for reverse osmosis brine separation. At some depths the hydrostatic pressure may be sufficient that no additional pumping is required to drive the reverse osmosis process. The residual pressure of the product water reduces the power needed to lift the product water for delivery to shore.

In preferred embodiments, utilizing the exterior seawater hydrostatic pressure each second and additional section 2, 2a has a through-hull seawater inlet for the RO systems to utilize the exterior hydrostatic pressure differential compared to the surface atmospheric pressure to reduce the power needed to pump inlet seawater to the pressure required for efficient desalination by the RO membrane. This is accomplished when the product water line is vented to the ocean surface atmospheric pressure. The residual hydrostatic pressure of the product water, after completing the reverse osmosis processes through the RO membranes reduces pumping power needed to lift the water to the surface. Using the hydrostatic pressure of the seawater at depth thus, enables reduced pumping pressure for the RO processes and for lifting the product to the surface resulting in lower cost for power.

Safety Margin on Buoyancy

Bulkheads and hatches isolate the second and additional sections 2, 2a, however some embodiments may allow for the flooding of one of these sections 2, 2a while still maintaining surface access.

In some embodiments (not shown) there may be excess buoyancy in the entire apparatus and the apparatus 100 may be moored by a tension leg mooring to an anchor on the seabed. Additionally or alternatively the ballast tank 32 may be emptied to provide sufficient buoyancy to offset the flooded chamber.

Power Source

The apparatus 100 of the present invention may be powered by an on-shore power source or a separate on-water source. However, the apparatus 100 is particularly suited to make use of off-shore renewable energy sources such as wave energy power generators, current turbines and/or off-shore wind turbines.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What we claim is:

1. A desalination method comprising steps of:
   floating, on a body of water, an apparatus comprising a first section defining a buoyancy chamber at least partially immersed at a waterline of the body of water in use and a second section that extends downward from the first section beneath the waterline of the body of water, the second section housing a plurality of reverse osmosis (RO) membrane tubes oriented vertically wherein the plurality of reverse osmosis membrane tubes are arranged around a passage and wherein the plurality of reverse osmosis membrane tubes are arranged to form an inner concentric ring and an outer concentric ring around the passage, wherein a diameter of the first section is greater than a diameter of the second section, the greater diameter of the first section as compared to the second section causing a center of buoyancy of the apparatus to be higher than a center of mass of the apparatus;
   intaking a volume of the body of water, under hydrostatic pressure, into the plurality of RO membrane tubes;
   generating fresh water from the plurality of RO membrane tubes; and
   venting the fresh water to atmospheric pressure;
   stopping, at one of the plurality of RO membrane tubes, the step of intaking the volume of the body of water while the second section is beneath the waterline of the body of water; and removing the stopped one of the plurality of RO membrane tubes from the apparatus with moving means capable of moving at least one reverse osmosis membrane tube into the passage while the second section is beneath the waterline of the body of water;
   replacing the removed RO membrane tube with a new RO membrane tube with the moving means while the second section is beneath the waterline of the body of water; and
   intaking another volume of the body of water, under hydrostatic pressure, into the new RO membrane tube.

2. The desalination method of claim 1, wherein the step of intaking comprises a step of pumping the volume of the body of water into the plurality of RO membrane tubes.

3. The desalination method of claim 2, further comprising a step of generating power from a renewable energy source, wherein the step of pumping is powered, at least in part, by the step of generating power from the renewable energy source.

4. The desalination method of claim 3, wherein the renewable energy source is wind energy, current energy, or wave energy.

5. The desalination method of claim 1, further comprising a step of pumping the fresh water for delivery to a shore of the body of water.

6. The desalination method of claim 1, further comprising a step of adjusting the center of buoyancy of the apparatus.

7. A deployment method for a desalination apparatus comprising steps of:
   floating horizontally, on a body of water, the desalination apparatus comprising a first cylindrical section including a buoyancy chamber and a second cylindrical section including a plurality of reverse osmosis (RO) membrane tubes and plumbing, said plurality of RO membrane tubes empty when floating horizontally, the second cylindrical section having sealing bulkheads at each end, wherein a diameter of the first cylindrical section is greater than a diameter of the second cylindrical section;

intaking a volume of the body of water into the plurality of RO membrane tubes and plumbing thereby shifting a center of mass of the desalination apparatus;

filling the plurality of RO membrane tubes and rotating the desalination apparatus ninety degrees to a vertical position such that the buoyancy chamber extends above a waterline of the body of water and the second cylindrical section extends downward beneath the waterline of the body of water such that the plurality of RO membrane tubes are oriented vertically, the greater diameter of the first cylindrical section as compared to the second cylindrical section causing a center of buoyancy of the desalination apparatus to be higher than the center of mass of the desalination apparatus adjusted by filling of the plurality of RO membrane tubes; and operating the rotated desalination apparatus with the plurality of RO membrane tubes oriented vertically to generate fresh water.

8. The deployment method of claim 7, further comprising a step of venting the fresh water from the plurality of RO membrane tubes to atmospheric pressure.

9. The deployment method of claim 7, wherein the step of intaking comprises a step of pumping the volume of the body of water into the plurality of RO membrane tubes.

10. The deployment method of claim 9, further comprising a step of generating power from a renewable energy source, wherein the step of pumping is powered, at least in part, by the step of generating power.

11. The deployment method of claim 10, wherein the renewable energy source is wind energy, current energy, or wave energy.

* * * * *